United States Patent
Ishida (10) Patent No.: US 7,518,966 B2
(45) Date of Patent: Apr. 14, 2009

(54) RECORDING/REPRODUCTION APPARATUS, RECORDING/REPRODUCTION METHOD, AND CONTROLLER FOR MAINTAINING DATA COMPATIBILITY

(75) Inventor: Takashi Ishida, Kyoto (JP)

(73) Assignee: Panasonic Corporation, Kadoma (JP)

( * ) Notice: Subject to any disclaimer, the term of this patent is extended or adjusted under 35 U.S.C. 154(b) by 276 days.

(21) Appl. No.: 10/567,304

(22) PCT Filed: Nov. 8, 2004

(86) PCT No.: PCT/JP2004/016556

§ 371 (c)(1),
(2), (4) Date: Aug. 22, 2006

(87) PCT Pub. No.: WO2005/045837

PCT Pub. Date: May 19, 2005

(65) Prior Publication Data

US 2007/0195667 A1    Aug. 23, 2007

(30) Foreign Application Priority Data

Nov. 10, 2003    (JP)    ............... 2003-380399

(51) Int. Cl.
*G11B 7/00* (2006.01)
(52) U.S. Cl. .................................... 369/53.2
(58) Field of Classification Search ........... None
See application file for complete search history.

(56) References Cited

U.S. PATENT DOCUMENTS

| | | | | |
|---|---|---|---|---|
| 4,893,193 A | * | 1/1990 | Nakamura et al. | 386/105 |
| 5,592,463 A | * | 1/1997 | Muramatsu et al. | 369/47.53 |
| 5,687,397 A | * | 11/1997 | Ohmori | 710/73 |
| 6,044,436 A | | 3/2000 | Otsuka | |

(Continued)

FOREIGN PATENT DOCUMENTS

| JP | 10-199136 A | 7/1998 |
|---|---|---|
| JP | 11-143751 A | 5/1999 |

OTHER PUBLICATIONS

International Search Report for corresponding Application No. PCT/JP2004/016556 mailed Jan. 18, 2005.

(Continued)

*Primary Examiner*—Peter Vincent Agustin
(74) *Attorney, Agent, or Firm*—Renner, Otto, Boisselle & Sklar, LLP (57) ABSTRACT

An apparatus for recording/reproducing data onto/from an information recording medium (101) is provided. The apparatus (1) comprises a section for reading first data from a first predetermined position in a data recording area of the medium, a section for determining whether or not the first data matches first type information indicating a type of a first predetermined file system, a section for executing a recording or reproduction process using the first predetermined file system when matching is positive, a section for reading second data from a second predetermined position of the data recording area when matching is negative, a section for determining whether or not the second data matches second type information indicating a type of a second predetermined file system different from that of the first predetermined file system, and a section for executing a recording or reproduction process using the second predetermined file system when matching is positive.

3 Claims, 7 Drawing Sheets

U.S. PATENT DOCUMENTS

| | | | |
|---|---|---|---|
| 6,778,479 B2 * | 8/2004 | Weng | 369/47.55 |
| 7,027,366 B2 * | 4/2006 | Sako et al. | 369/30.04 |
| 7,065,021 B2 * | 6/2006 | Tol et al. | 369/53.2 |
| 2002/0044509 A1 * | 4/2002 | Nakajima | 369/53.22 |
| 2003/0147323 A1 * | 8/2003 | Sako et al. | 369/53.22 |

OTHER PUBLICATIONS

Supplemental Search Report issued against the corresponding European Application No. 04 818 228.1 dated Jun. 20, 2008.

* cited by examiner

FIG.1

FIG.2A 201a
202a Type information

FIG.2B 201b
201b Type information

RECORDING/REPRODUCTION APPARATUS, RECORDING/REPRODUCTION METHOD, AND CONTROLLER FOR MAINTAINING DATA COMPATIBILITY

TECHNICAL FIELD

The present invention relates to a recording/reproduction apparatus, a recording/reproduction method, and a controller.

BACKGROUND ART

Conventionally, data is recorded/reproduced to/from an information recording medium in accordance with a specific format in which a rule for recording/reproduction is defined.

Contents which are protected by copyright are recorded in a form which does not allow unauthorized replication of the data, by means of encryption or the like.

DISCLOSURE OF THE INVENTION

Problems to be Solved by the Invention

Recently, the volume of information recording media has been increased.

For example, the volumes of optical discs have been increased from 640 MB (CD-R) to 4.7 GB (DVD-RAM) to 25 GB (Blu-ray disc). As the volume is increased, the optical discs are becoming means for storing any type of data, such as computer data, audio data, video data and the like.

Each type of data has a format appropriate for recording/reproduction, and needs to be recorded in its appropriate format.

In order to copy-protect data, it is necessary to select a copy protection method, depending on the level of importance of the data.

An object of the present invention is to provide a recording/reproduction apparatus, a recording/reproduction method and a controller which can solve the above-described problems.

Means for Solving the Problems

A recording/reproduction apparatus for recording/reproducing data onto/from an information recording medium, comprising a section for reading first data from a first predetermined position in a data recording area of the information recording medium, a section for determining whether or not the first data matches first type information indicating a type of a first predetermined file system, a section for executing a recording process or a reproduction process using the first predetermined file system when it is determined that the first data matches the first type information, a section for reading second data from a second predetermined position of the data recording area when it is determined that the first data does not match the first type information, a section for determining whether or not the second data matches second type information indicating a type of a second predetermined file system which is different from that of the first predetermined file system, and a section for executing a recording process or a reproduction process using the second predetermined file system when it is determined that the second data matches the second type information.

A recording/reproduction method for recording/reproducing data onto/from an information recording medium, comprising reading first data from a first predetermined position in a data recording area of the information recording medium, determining whether or not the first data matches first type information indicating a type of a first predetermined file system, executing a recording process or a reproduction process using the first predetermined file system when it is determined that the first data matches the first type information, reading second data from a second predetermined position of the data recording area when it is determined that the first data does not match the first type information, determining whether or not the second data matches second type information indicating a type of a second predetermined file system which is different from that of the first predetermined file system, and executing a recording process or a reproduction process using the second predetermined file system when it is determined that the second data matches the second type information.

A controller for use in a recording/reproduction apparatus for recording/reproducing data onto/from an information recording medium, comprising a section for outputting a command for reading first data from a first predetermined position in a data recording area of the information recording medium, a section for determining whether or not the first data matches first type information indicating a type of a first predetermined file system, a section for outputting a command for executing a recording process or a reproduction process using the first predetermined file system when it is determined that the first data matches the first type information, a section for outputting a command for reading second data from a second predetermined position of the data recording area when it is determined that the first data does not match the first type information, a section for determining whether or not the second data matches second type information indicating a type of a second predetermined file system which is different from that of the first predetermined file system, and a section for outputting a command for executing a recording process or a reproduction process using the second predetermined file system when it is determined that the second data matches the second type information.

Effects of the Invention

According to the present invention, the number of file systems to be applied to an optical disc is fixed to be one. Therefore, data compatibility can be maintained even when one optical disc is used in different drive apparatuses.

Further, according to the present invention, the number of file systems to be applied to an optical disc is fixed to be one. Therefore, data compatibility can be maintained even when one optical disc is used in different drive apparatuses.

DESCRIPTION OF THE REFERENCE NUMERALS 1 optical disc apparatus
4 disc detection apparatus
6 controller
8 memory
10 drive apparatus
12 data input terminal
16 control terminal
101 optical disc
102 track
103 lead-in area
103a type information
104 data recording area
105 lead-out area
105a type information
201a optical disc
201b optical disc
202a type information
202b type information

BEST MODE FOR CARRYING OUT THE INVENTION

Hereinafter, the present invention will be described by way of illustrative examples with reference to the accompanying drawings.

1. Embodiment 1

1.1 Structure of Optical Disc

Figure 1:
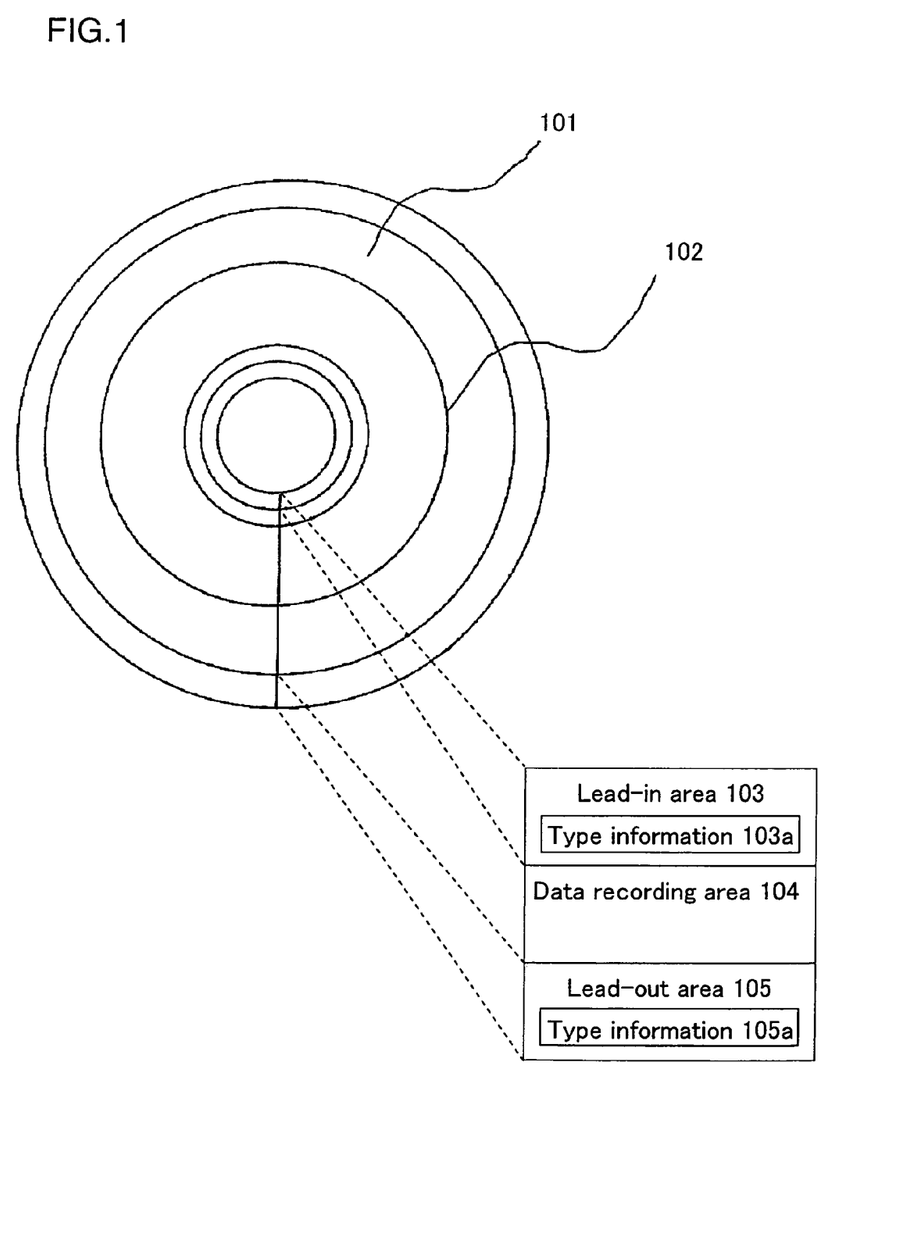
FIG. 1 is a diagram showing an exemplary structure of an optical disc 101.

FIG. 1 shows an exemplary structure of an optical disc 101.

The optical disc 101 has a plurality of concentric tracks 102, or a single or a plurality of spiral tracks 102.

The optical disc 101 includes a lead-in area 103, a data recording area 104, and a lead-out area 105.

The lead-in area 103 is provided in an innermost periphery of the optical disc 101. The lead-out area 105 is provided in an outermost periphery of the optical disc 101.

The lead-in area 103 stores type information 103a which indicates a type of a file system which is used for the optical disc 101. The type information 103a is represented by, for example, a wobble shape of the track 102. Alternatively, the type information 103a may be represented by embossed pits formed on the optical disc 101.

The lead-out area 105 stores type information 105a which is the same information as the type information 103a. The type information 105a is represented as is the type information 103a. The type information 105a is used as a backup for the type information 103a. For example, when the type information 103a is tried to be read from the lead-in area 103 but the read operation fails due to a certain reason, such as a defective area or the like in the lead-in area 103, the type information 105a is read out in place of the type information 103a from the lead-out area 105.

Figure 2A:
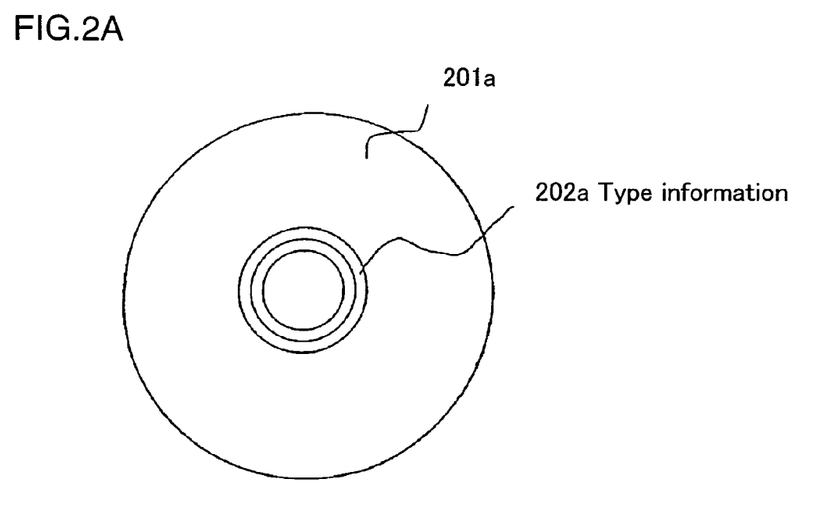
FIG. 2A is a diagram showing an optical disc 201a as an example of the optical disc 101 having the structure of FIG. 1.

FIG. 2A shows an optical disc 201a as an example of the optical disc 101 having the structure of FIG. 1. On the optical disc 201a, for example, type information 202a indicating that a Blu-ray Disc File System (BDFS) is used in the optical disc 201a is recorded. The type information 202a is, for example, an identifier for the BDFS. The BDFS identifier is represented by, for example, a character string "BDFS". The BDFS is a file system for used in Blu-ray (BD) recorders and is appropriate for recording/reproduction of AV data. As used herein, the term "AV data" refers to data including at least one of video data and audio data. AV data has a large file size and needs to be reproduced in real time without a drop. AV data is also called "real time data".

Figure 2B:
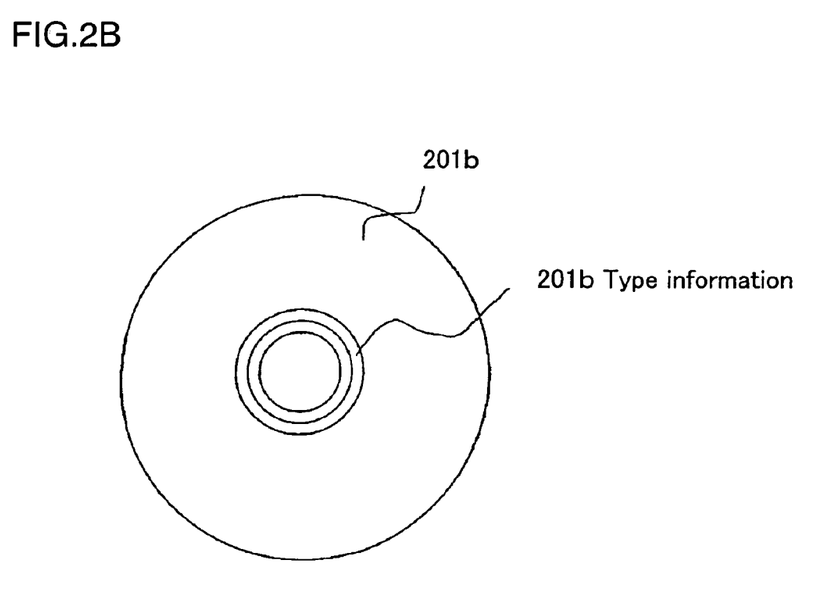
FIG. 2B is a diagram showing an optical disc 201b as another example of the optical disc 101 of the structure of FIG. 1.

FIG. 2B shows an optical disc 201b as another example of the optical disc 101 of the structure of FIG. 1. On the optical disc 201b, for example, type information 202b indicating that a file system used in the optical disc 201b is in a Universal Disc format (UDF). The type information 202b is, for example, an identifier for the UDF. The UDF identifier is represented by, for example, a character string "UDF". The UDF is a file system for used in computers (e.g., personal computers (PCs)) and is appropriate for recording/reproduction of computer data as well as AV data. As used herein, the term "computer data" refers to any binary data or program which can be processed by a computer. Computer data has a small file size and needs to be highly reliable.

Although optical discs are described as examples of an information recording medium in the above-described embodiment, the present invention is not limited to this. Any information recording media may be used in place of Optical discs.

1.2 Structure of Optical Disc Apparatus

Figure 3:
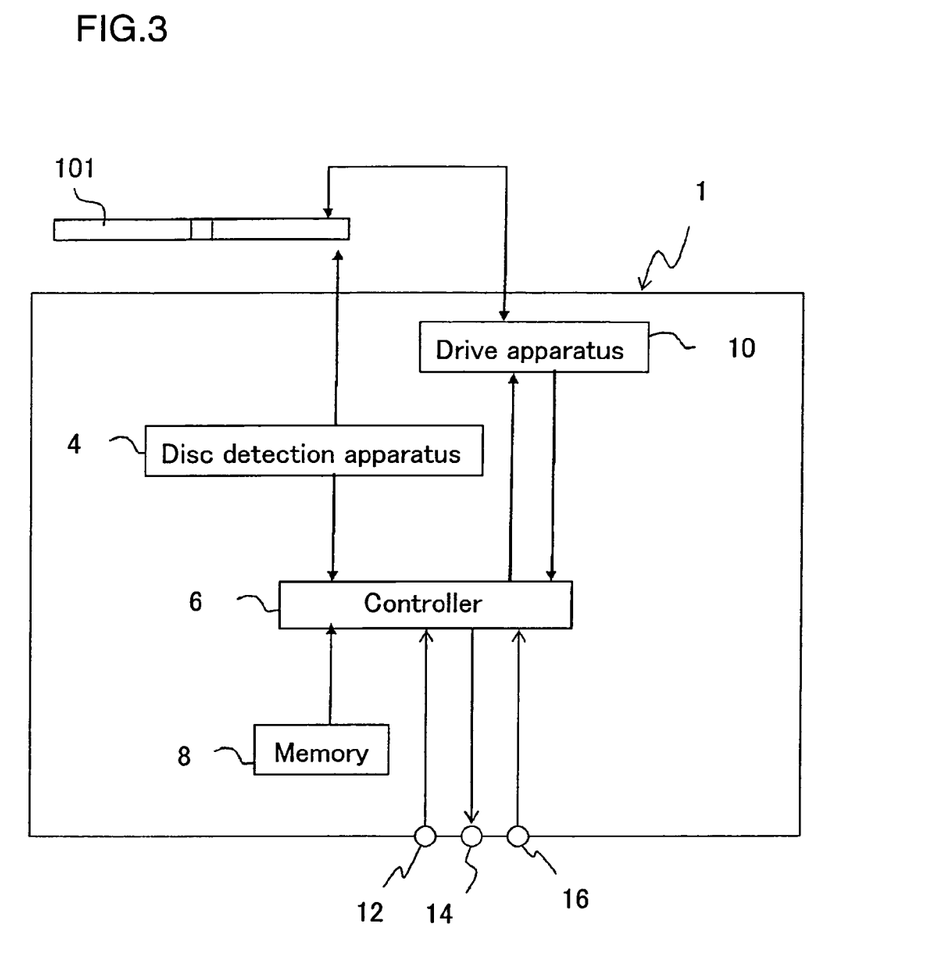
FIG. 3 is a diagram showing an exemplary structure of an optical disc apparatus 1.

FIG. 3 shows an exemplary structure of an optical disc apparatus 1.

The optical disc apparatus 1 comprises a disc detection apparatus 4, a drive apparatus 10, a controller 6, and a memory 8.

The disc detection apparatus 4 detects when the optical disc 101 is loaded into the optical disc apparatus 1 and outputs a detection signal to the controller 6.

The drive apparatus 10 formats the optical disc 101, records data onto the optical disc 101, or reproduced data recorded on the optical disc 101.

The controller 6 controls an operation of the whole optical disc 101. For example, the controller 6 executes a formatting process which formats the optical disc 101, a recording process which records data onto the optical disc 101, or a reproduction process which reproduces data recorded on the optical disc 101. The controller 6 may be implemented using a microprocessor, for example. The microprocessor may be formed on a single semiconductor chip.

The memory 8 stores a formatting program for causing the controller 6 to execute a formatting process, a recording program for causing the controller 6 to execute a recording process, a reproduction program for causing the controller 6 to execute a reproduction process, data required to execute these programs, or the like.

The optical disc apparatus 1 further comprises a data input terminal 12, a data output terminal 14, and a control terminal 16.

Data to be recorded onto the optical disc 101 is input via the data input terminal 12 to the controller 6 from the outside of the optical disc apparatus 1. The controller 6 controls the drive apparatus 10 to record the input data onto the optical disc 101.

Data reproduced from the optical disc 101 is output via the drive apparatus 10 to the controller 6. The controller 6 outputs the data output from the drive apparatus 10, via the data output terminal 14 to the outside of the optical disc apparatus 1.

The control terminal 16 is used to input a control signal indicating a command given from the outside of the optical disc apparatus 1 into the controller 6. The controller 6 receives via the control terminal 16 the command input from the outside of the optical disc apparatus 1 and executes a process in accordance with the command. For example, the controller 6 executes a formatting process when receiving a formatting command, a recording process when receiving a recording command, and a reproduction process when receiving a reproduction command.

1.3 Operation of Optical Disc Apparatus

Figure 4:
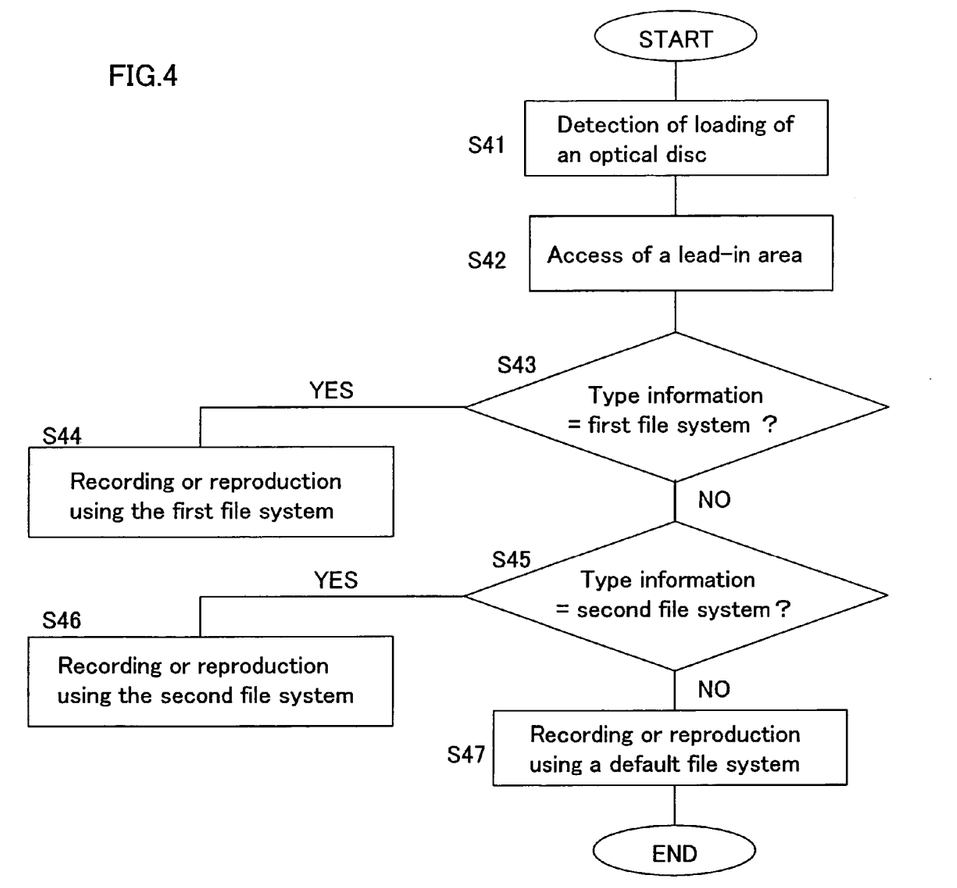
FIG. 4 is a flowchart showing an exemplary operation of an optical disc apparatus 1.

FIG. 4 shows an exemplary operation of an optical disc apparatus 1. The operation is achieved by, for example, the controller 6 executing a program stored in the memory 8.

In step S41, the disc detection apparatus 4 detects when the optical disc 101 is loaded into the optical disc apparatus 1 and outputs a detection signal to the controller 6. In response to the detection signal, the controller 6 outputs a command requesting the drive apparatus 10 to read the type information 103a indicating a file system used on the optical disc 101 from the lead-in area 103 of the optical disc 101. Here, a position on the optical disc 101 at which the type information 103a is recorded is assumed to be previously determined. For example, the type information 103a is recorded in an L-th logical sector counted from the head of the lead-in area 103, where L is an arbitrary integer greater than or equal to one.

In step S42, the drive apparatus 10 reads the type information 103a from the lead-in area 103 by accessing the lead-in area 103 in accordance with the command from the controller 6. The type information 103a read by the drive apparatus 10 is output to the controller 6.

In step S43, the controller 6 determines whether or not a file system indicated by the type information 103a is a first predetermined file system. For example, the first predetermined file system is the BDFS. In this case, the determination is performed by, for example, determining whether or not a file system identifier indicated by the type information 103a matches an identifier for the first predetermined file system (e.g., the BDFS). When the result of the determination is positive ("YES"), the controller 6 outputs a command requesting the drive apparatus 10 to execute a predetermined process (e.g., a formatting process, a recording process, or a reproduction process) using the first predetermined file system. The process goes to step S44. When the result of the determination is negative ("NO"), the process goes to step S45.

In step S44, the drive apparatus 10 executes a predetermined process (e.g., a formatting process, a recording process, or a reproduction process) using the first predetermined file system in accordance with the command from the controller 6.

In step S45, the controller 6 determines whether or not a file system indicated by the type information 103a is a second predetermined file system which is different from the first predetermined file system. For example, the second predetermined file system is the UDF. In this case, the determination is performed by, for example, determining whether or not a file system identifier indicated by the type information 103a matches an identifier for the second predetermined file system (e.g., the UDF). When the result of the determination is positive ("YES"), the controller 6 outputs a command requesting the drive apparatus 10 to execute a predetermined process (e.g., a formatting process, a recording process, or a reproduction process) using the second predetermined file system. The process goes to step S46. When the result of the determination is negative ("NO"), the controller 6 outputs a command requesting the drive apparatus 10 to execute a predetermined process (e.g., a formatting process, a recording process, or a reproduction process) using a default file system. The process goes to step S47.

In step S46, the drive apparatus 10 executes a predetermined process (e.g., a formatting process, a recording process, or a reproduction process) using the second predetermined file system in accordance with the command from the controller 6.

In step S47, the drive apparatus 10 executes a predetermined process (e.g., a formatting process, a recording process, or a reproduction process) using the default file system in accordance with the command from the controller 6.

For example, the default file system is previously determined depending on the type of data which is mainly handled by the optical disc apparatus 1. For example, when the optical disc apparatus 1 is a BD recorder, most data handled by the optical disc apparatus 1 is AV data. Therefore, in this case, the default file system is set to be a file system suitable for processing of AV data (e.g., the BDFS). For example, when the optical disc apparatus 1 is a computer drive, most data handled by the optical disc apparatus 1 is computer data. Therefore, in this case, the default file system is set to be a file system suitable for computer data (e.g., the UDF).

Thus, by previously recording the type information 103a indicating the type of a file system used in the optical disc 101 in the lead-in area 103 of the optical disc 101, the optical disc apparatus 1 can execute a predetermined process (e.g., a formatting process, a recording process, or a reproduction process) using a file system corresponding to the type information 103a. Thereby, the number of file systems to be applied to an optical disc is fixed to be one. Therefore, data compatibility can be maintained even when a single optical disc is used in different drives.

2. Embodiment 2

2.1 Structure of Optical Disc

An optical disc used in Embodiment 2 is the same as the optical disc 101 of Embodiment 1 of FIG. 1, and therefore, will not be explained in detail.

2.2 Structure of Optical Disc Means

An optical disc apparatus used in Embodiment 2 is the same as the optical disc apparatus of Embodiment 1 of FIG. 3, and therefore, will not be explained in detail.

2.3 Operation of Optical Disc Apparatus

Figure 5:
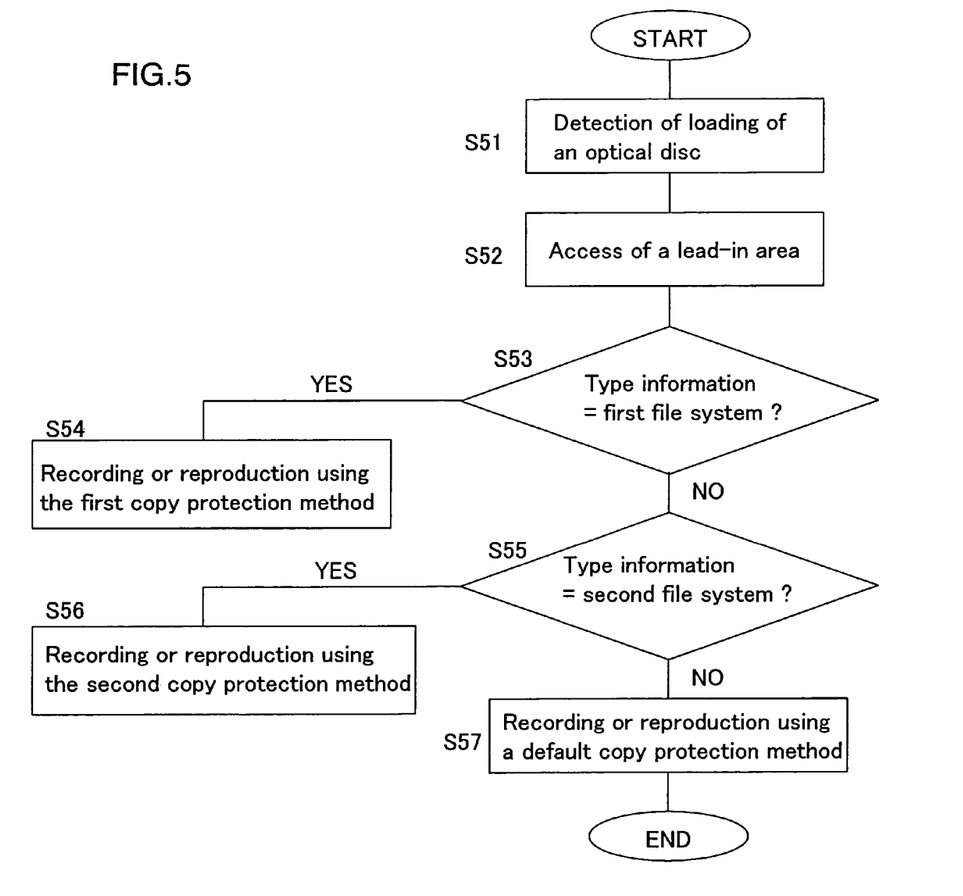
FIG. 5 is a flowchart showing an exemplary operation of an optical disc apparatus 1.

FIG. 5 shows an exemplary operation of an optical disc apparatus 1. The operation is achieved by, for example, the controller 6 executing a program stored in the memory 8.

In step S51, the disc detection apparatus 4 detects when the optical disc 101 is loaded into the optical disc apparatus 1 and outputs a detection signal to the controller 6. In response to the detection signal, the controller 6 outputs a command requesting the drive apparatus 10 to read the type information 103a indicating a file system used on the optical disc 101 from the lead-in area 103 of the optical disc 101. Here, a position on the optical disc 101 at which the type information 103a is recorded is assumed to be previously determined. For example, the type information 103a is recorded in an L-th logical sector counted from the head of the lead-in area 103, where L is an arbitrary integer greater than or equal to one.

In step S52, the drive apparatus 10 reads the type information 103a from the lead-in area 103 by accessing the lead-in area 103 in accordance with the command from the controller 6. The type information 103a read by the drive apparatus 10 is output to the controller 6.

In step S53, the controller 6 determines whether or not a file system indicated by the type information 103a is a first predetermined file system. For example, the first predetermined file system is the BDFS. In this case, the determination is performed by, for example, determining whether or not a file system identifier indicated by the type information 103a matches an identifier for the first predetermined file system (e.g., the BDFS). When the result of the determination is positive ("YES"), the process goes to step S54. When the result of the determination is negative ("NO"), the process goes to step S55.

In step S54, a recording or reproduction process is executed in accordance with a first predetermined copy protection method. The first predetermined copy protection method is a method which employs DATA ENCRYPTION STANDARD (DES; Federal Information Processing Standards Publication 46-3).

The recording process is executed as follows. The controller 6 encrypts data to be recorded in accordance with the first predetermined copy protection method, and outputs a command requesting the drive apparatus 10 to record the encrypted data into the data recording area 104. The drive apparatus 10 records the encrypted data into the data recording area 104 in accordance with the command from the controller 6.

The reproduction process is executed as follows. The controller 6 outputs a command requesting the drive apparatus 10 to read encrypted data from the data recording area 104. The drive apparatus 10 reads the encrypted data from the data recording area 104 in accordance with the command from the controller 6. The encrypted data read by the drive apparatus 10 is output to the controller 6. The controller 6 is decrypted in accordance with the first predetermined copy protection method.

In step S55, the controller 6 determines whether or not a file system indicated by the type information 103a is a second predetermined file system which is different from the first predetermined file system. For example, the second predetermined file system is the UDF. In this case, the determination is performed by, for example, determining whether or not a file system identifier indicated by the type information 103a matches an identifier for the second predetermined file system (e.g., the UDF). When the result of the determination is positive ("YES"), the process goes to step S56. When the result of the determination is negative ("NO"), the process goes to step S57.

In step S56, a recording or reproduction process is executed in accordance with a second predetermined copy protection method. The second predetermined copy protection method is a method which employs ADVANCED ENCRYPTION STANDARD (AES; Federal Information Processing Standards Publication 197). AES encryption is more difficult to decipher than DES encryption.

The recording process is executed as follows. The controller 6 encrypts data to be recorded in accordance with the second predetermined copy protection method, and outputs a command requesting the drive apparatus 10 to record the encrypted data into the data recording area 104. The drive apparatus 10 records the encrypted data into the data recording area 104 in accordance with the command from the controller 6.

The reproduction process is executed as follows. The controller 6 outputs a command requesting the drive apparatus 10 to read encrypted data from the data recording area 104. The drive apparatus 10 reads the encrypted data from the data recording area 104 in accordance with the command from the controller 6. The encrypted data read by the drive apparatus 10 is output to the controller 6. The controller 6 is decrypted in accordance with the second predetermined copy protection method.

In step S57, a recording or reproduction process is executed in accordance with a default copy protection method corresponding to a default file system.

The default copy protection method is previously set depending on the default file system. For example, when the default file system is a file system suitable for processing of AV data (e.g., the BDFS), the default copy protection method is set to be a copy protection method suitable for processing of AV data (e.g., a method using DES encryption). For example, when the default file system is a file system suitable for computer data (e.g., the UDF), the default copy protection method is set to be a copy protection method suitable for processing of AV data (e.g., a method using AES encryption).

Thus, by previously recording the type information 103a indicating the type of a file system used in the optical disc 101 in the lead-in area 103 of the optical disc 101, the optical disc apparatus 1 can execute a predetermined process (e.g., a formatting process, a recording process, or a reproduction process) using a file system corresponding to the type information 103a. Thereby, the number of file systems to be applied to an optical disc is fixed to be one. Therefore, data compatibility can be maintained even when a single optical disc is used in different drives.

3. Embodiment 3

3.1 Structure of Optical Disc

An optical disc used in Embodiment 3 is basically the same as the optical disc 101 of Embodiment 1 of FIG. 1. However, in Embodiment 3, the type information 103a is not necessarily recorded in the lead-in area 103, and the type information 105a is also not necessarily recorded in the lead-out area 105.

In Embodiment 3, data is previously recorded using a predetermined file system in the data recording area 104 on the optical disc 101. However, type information indicating the type of the predetermined file system is not previously recorded in the lead-in area 103 or the lead-out area 105.

The type information indicating the type of the predetermined file system is previously recorded in the data recorded area 104. The recording position is previously determined depending on a file system previously used on the optical disc 101. For example, when data is previously recorded in the data recording area 104 using a first predetermined file system (e.g., the BDFS), it is previously determined that first type information indicating the type of the first predetermined file system is recorded at a first predetermined position of the data recording area 104 (e.g., an M-th logical sector counted from the head of the data recording area 104). When data is previously recorded in the data recording area 104 using a second file system (e.g., the UDF) different from the first predetermined file system, it is previously determined that second type information indicating the type of the second predetermined file system is recorded at a second predetermined position of the data recording area 104 (e.g., an N-th logical sector counted from the head of the data recording area 104). Here, M and N are each an arbitrary integer of 1 or more. The first and second predetermined positions may be either the same or different from each other (i.e., either M=N or M≠N).

The first type information is, for example, an identifier for the BDFS. The BDFS identifier is represented by, for example, a character string "BDFS". The second type information is, for example, an identifier for the UDF. The UDF identifier is represented by, for example, a character string "UDF".

3.2 Structure of Optical Disc Means

An optical disc apparatus used in Embodiment 3 is the same as the optical disc apparatus of Embodiment 1 of FIG. 3, and therefore, will not be explained in detail.

3.3 Operation of Optical Disc Apparatus

Figure 6:
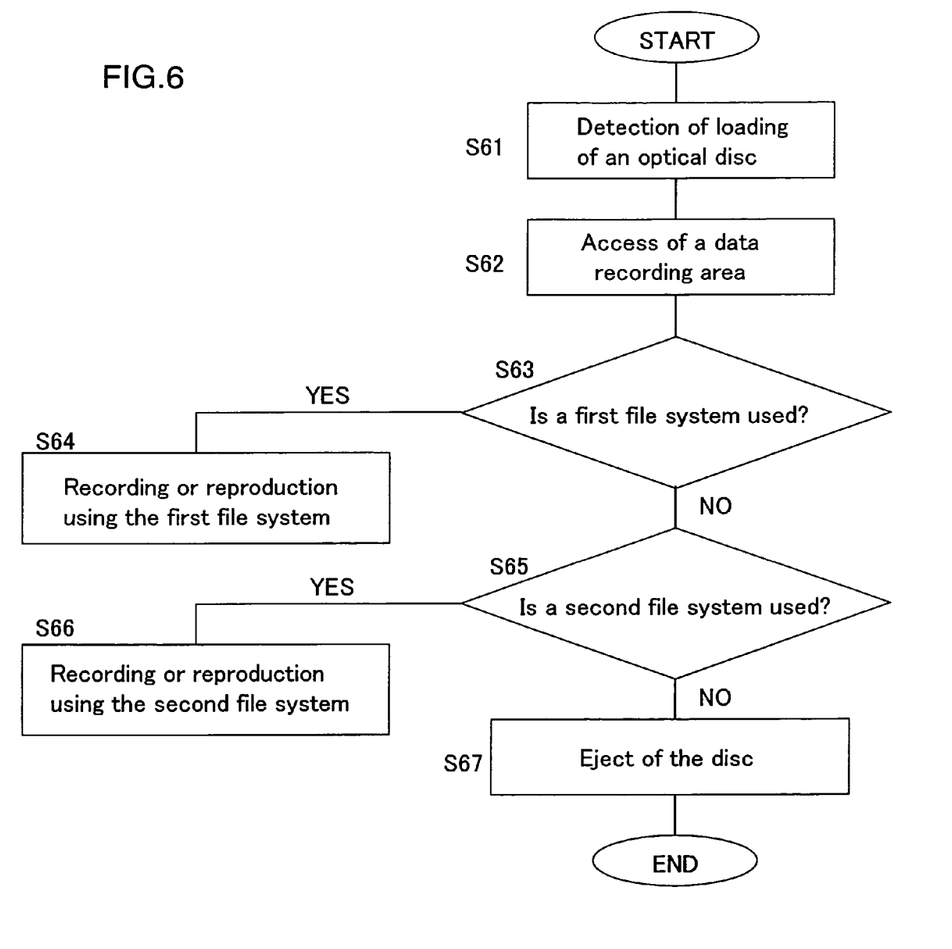
FIG. 6 is a flowchart showing an exemplary operation of an optical disc apparatus 1.

FIG. 6 shows an exemplary operation of an optical disc apparatus 1. The operation is achieved by, for example, the controller 6 executing a program stored in the memory 8.

In step S61, the disc detection apparatus 4 detects when the optical disc 101 is loaded into the optical disc apparatus 1 and outputs a detection signal to the controller 6. In response to the detection signal, the controller 6 outputs a command requesting the drive apparatus 10 to read data from the first predetermined position in the data recording area 104, assuming that "a file system used in the optical disc 101 is the first predetermined file system". Here, the first predetermined position is a position at which the first type information indicating the type of the first predetermined file system is recorded, when a file system actually used in the optical disc 101 is the first predetermined file system.

In step S62, the drive apparatus 10 reads data from the first predetermined position by accessing the data recording area 104 in accordance with the command from the controller 6. The data read by the drive apparatus 10 is output to the controller 6.

In step S63, the controller 6 determines whether or not the data output from the drive apparatus 10 matches the first type information indicating the type of the first predetermined file system. For example, the first predetermined file system is the BDFS. In this case, the determination is performed by, for example, determining whether or not the data output from the drive apparatus 10 matches an identifier for the first predetermined file system (e.g., the BDFS). When the result of the determination is positive ("YES"), the controller 6 outputs a command requesting the drive apparatus 10 to execute a predetermined process (e.g., a formatting process, a recording process, or a reproduction process) using the first predetermined file system. The process goes to step S64. When the result of the determination is negative ("NO"), the assumption that "a file system used in the optical disc 101 is the first predetermined file system" is false. In this case, the controller 6 outputs a command requesting the drive apparatus 10 to read data from the second predetermined position in the data recording area 104, assuming that "a file system used in the optical disc 101 is the second predetermined file system". Here, when the second predetermined position is a position at which second type information indicating the second predetermined file system is recorded, when the file system actually used in the optical disc 101 is the second predetermined file system. Thereafter, the process goes to step S65.

In step S64, the drive apparatus 10 executes a predetermined process (e.g., a formatting process, a recording process or a reproduction process) in accordance with the command from the controller 6.

In step S65, the controller 6 determines whether or not data output from the drive apparatus 10 matches the second type information indicating the second predetermined file system. For example, the second predetermined file system is the UDF. In this case, the determination is performed by, for example, determining whether or not a file system identifier indicated by the type information 103a matches an identifier for the second predetermined file system (e.g., the UDF). When the result of the determination is positive ("YES"), the controller 6 outputs a command requesting the drive apparatus 10 to execute a predetermined process (e.g., a formatting process, a recording process, or a reproduction process) using the second predetermined file system. The process goes to step S66. When the result of the determination is negative ("NO"), the assumption that "a file system used in the optical disc 101 is the second predetermined file system" is false. In this case, the controller 6 cannot recognize the file system used in the optical disc 101, and instructs a loading mechanism to eject the optical disc 101 from the optical disc apparatus 1. Thereafter, the process goes to step S67.

In step S66, the drive apparatus 10 executes a predetermined process (e.g., a formatting process, a recording process or a reproduction process) using the second predetermined file system in accordance with the command from the controller 6.

In step S67, the optical disc 101 is ejected from the optical disc apparatus 1.

Thus, the type of a file system which is previously used to record data can be identified from data recorded in the data recording area 104 on the optical disc 101, and a predetermined file system which is the same as that of the identified type can be used to execute a predetermined process (e.g., a formatting process, a recording process or a reproduction process). Thereby, the number of file systems to be applied to an optical disc is fixed to be one. Therefore, data compatibility can be maintained even when a single optical disc is used in different drives.

4. Embodiment 4

4.1 Structure of Optical Disc

An optical disc used in Embodiment 4 is the same as the optical disc 101 of Embodiment 1 of FIG. 1, and therefore, will not be explained in detail.

Data previously recorded in the data recording area 104 is processed in accordance with a predetermined copy protection method.

4.2 Structure of Optical Disc Apparatus

An optical disc apparatus used in Embodiment 4 is the same as the optical disc apparatus 1 of Embodiment 1 of FIG. 3, and therefore, will not be explained in detail.

4.3 Operation of Optical Disc Apparatus

Figure 7:
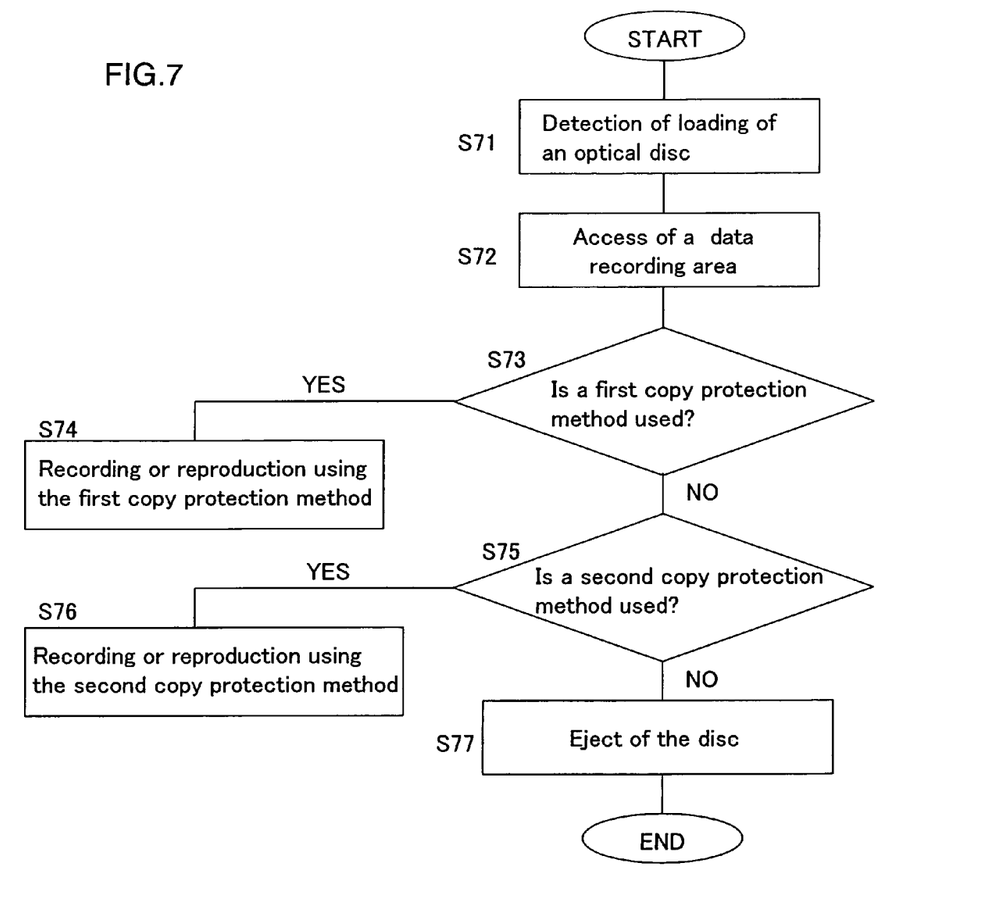
FIG. 7 is a flowchart showing an exemplary operation of an optical disc apparatus 1.

FIG. 7 shows an exemplary operation of an optical disc apparatus 1. The operation is achieved by, for example, the controller 6 executing a program stored in the memory 8.

In step S71, the disc detection apparatus 4 detects when the optical disc 101 is loaded into the optical disc apparatus 1 and outputs a detection signal to the controller 6. In response to the detection signal, the controller 6 outputs a command requesting the drive apparatus 10 to read data from the data recording area 104.

In step S72, the drive apparatus 10 reads data from the data recording area 104 by accessing the data recording area 104 in accordance with the command from the controller 6. The data read by the drive apparatus 10 is output to the controller 6.

In step S73, the controller 6 determines whether or not the data output from the drive apparatus 10 is encrypted in accordance with a first predetermined copy protection method. The first predetermined copy protection method employs, for example, DES encryption. For example, the determination is performed by determining whether or not the data (encrypted data) output from the drive apparatus 10 can be correctly decrypted in accordance with a method which employs DES encryption. The decryption of the encrypted data is performed using a key which is contained in the controller 6 and is specific to the optical disc apparatus 1 (e.g., an identification number of the optical disc apparatus 1) and a key which is recorded in the lead-in area 103 of the optical disc 101 and is specific to the optical disc 101 (e.g., an identification number of the optical disc 101) as decryption keys. For example, when an identifier of a first predetermined file system (e.g., a character string "BDFS") or an identifier of a second predetermined file system (e.g., a character string "UDF") is contained in the decrypted data, it is determined that the encrypted data can be correctly decrypted in accordance with the method employing DES encryption. When the result of the determination is positive ("YES"), the process goes to step S74. When the result of the determination is negative ("NO"), the process goes to step S75.

In step S74, a recording or reproduction process is executed in accordance with the first predetermined copy protection method.

The recording process is executed as follows. The controller 6 encrypts data to be recorded in accordance with the first predetermined copy protection method, and outputs a command requesting the drive apparatus 10 to record the encrypted data into the data recording area 104. The drive apparatus 10 records the encrypted data into the data recording area 104 in accordance with the command from the controller 6.

The reproduction process is executed as follows. The controller 6 outputs a command requesting the drive apparatus 10 to read encrypted data from the data recording area 104. The drive apparatus 10 reads the encrypted data from the data recording area 104 in accordance with the command from the controller 6. The encrypted data read by the drive apparatus 10 is output to the controller 6. The controller 6 is decrypted in accordance with the first predetermined copy protection method.

In step S75, the controller 6 determines whether or not the data output from the drive apparatus 10 is encrypted in accordance with the second predetermined copy protection method. The second predetermined copy protection method employs, for example, AES encryption. For example, the determination is performed by determining whether or not the data (encrypted data) output from the drive apparatus 10 can be correctly decrypted in accordance with a method which employs AES encryption. The decryption of the encrypted data is performed using a key which is contained in the controller 6 and is specific to the optical disc apparatus 1 (e.g., an identification number of the optical disc apparatus 1) and a key which is recorded in the lead-in area 103 of the optical disc 101 and is specific to the optical disc 101 (e.g., an identification number of the optical disc 101) as decryption keys. For example, when an identifier of a first predetermined file system (e.g., a character string "BDFS") or an identifier of a second predetermined file system (e.g., a character string "UDF") is contained in the decrypted data, it is determined that the encrypted data can be correctly decrypted in accordance with the method employing DES encryption. When the result of the determination is positive ("YES"), the process goes to step S76. When the result of the determination is negative ("NO"), the controller 6 cannot recognize the type of encryption which is used for the data output from the drive apparatus 10. Therefore, the controller 6 instructs a loading mechanism (not shown) to eject the optical disc 101 from the optical disc apparatus 1. Thereafter, the process goes to step S77.

In step S76, a recording process or a reproduction process is executed in accordance with the second predetermined copy protection method.

The recording process is executed as follows. The controller 6 encrypts data to be recorded in accordance with the second predetermined copy protection method, and outputs a command requesting the drive apparatus 10 to record the encrypted data into the data recording area 104. The drive apparatus 10 records the encrypted data into the data recording area 104 in accordance with the command from the controller 6.

The reproduction process is executed as follows. The controller 6 outputs a command requesting the drive apparatus 10 to read encrypted data from the data recording area 104. The drive apparatus 10 reads the encrypted data from the data recording area 104 in accordance with the command from the controller 6. The encrypted data read by the drive apparatus 10 is output to the controller 6. The controller 6 is decrypted in accordance with the second predetermined copy protection method.

In step S77, the optical disc 101 is ejected from the optical disc apparatus 1.

Thus, the type of a copy protection method which is previously used to record data can be identified from data recorded in the data recording area 104 on the optical disc 101, and a copy protection method which is the same as that of the identified type can be used to execute a predetermined process (e.g., a formatting process, a recording process or a reproduction process). Thereby, the number of file systems to be applied to an optical disc is fixed to be one. Therefore, data compatibility can be maintained even when a single optical disc is used in different drives.

In the above-described Embodiments 1 to 4, the type information indicates the type of a file system which is employed on the optical disc 101. The type information may indicate whether the optical disc 101 is a disc for recording AV data or a disk for recording computer data. Alternatively, the type information may indicate whether the optical disc 101 is a consumer disc or a business disc. Even in these cases, it is possible to select an optimum file system corresponding to the type information. Further, it is possible to select an optimum copy protection method corresponding to the type information.

Note that a recording/reproduction apparatus, a recording/reproduction method, and a controller described below fall within the scope of the present invention. These correspond to Embodiments 1 and 2.

A1. A recording/reproduction apparatus for recording/reproducing data onto/from an information recording medium, wherein type information indicating a type of a file system used on the information recording medium is recorded in a lead-in area of the information recording medium, the apparatus comprising:

a section for reading the type information from the lead-in area of the information recording medium; and a section for executing a recording process or a reproduction process using a file system corresponding to the type information.

A2. A recording/reproduction apparatus according to item A1, further comprising a section for formatting the information recording medium using the file system corresponding to the type information.

A3. A recording/reproduction apparatus according to item A1, further comprising a section for encrypting data to be recorded onto the information recording medium, in accordance with a copy protection method corresponding to the file system, or decrypting encrypted data recorded on the information recording medium.

A4. A recording/reproduction method for recording/reproducing data onto/from an information recording medium, wherein type information indicating a type of a file system used on the information recording medium is recorded in a lead-in area of the information recording medium, the method comprising:

reading the type information from the lead-in area of the information recording medium; and executing a recording process or a reproduction process using a file system corresponding to the type information.

A5. A recording/reproduction method according to item A4, further comprising formatting the information recording medium using the file system corresponding to the type information.

A6. A recording/reproduction method according to item A5, further comprising encrypting data to be recorded onto the information recording medium, in accordance with a copy protection method corresponding to the file system, or decrypting encrypted data recorded on the information recording medium.

A7. A controller for use in a recording/reproduction apparatus which records/reproduces data onto/from an information recording medium, wherein type information indicating a type of a file system-used on the information recording medium is recorded in a lead-in area of the information recording medium, the controller comprising:

a section for outputting a command for reading the type information from the lead-in area of the information recording medium; and a section for outputting a command for executing a recording process or a reproduction process using a file system corresponding to the type information.

A8. A controller according to item A7, further comprising a section for outputting a command for formatting the information recording medium using the file system corresponding to the type information.

A9. A controller according to item A7, further comprising a section for outputting a command for encrypting data to be recorded onto the information recording medium, in accordance with a copy protection method corresponding to the file system, or decrypting encrypted data recorded on the information recording medium.

Note that a recording/reproduction apparatus, a recording/reproduction method, and a controller described below fall within the scope of the present invention. These correspond to Embodiment 3.

B1. A recording/reproduction apparatus for recording/reproducing data onto/from an information recording medium, comprising:

a section for reading first data from a first predetermined position in a data recording area of the information recording medium;

a section for determining whether or not the first data matches first type information indicating a type of a first predetermined file system;

a section for executing a recording process or a reproduction process using the first predetermined file system when it is determined that the first data matches the first type information;

a section for reading second data from a second predetermined position of the data recording area when it is determined that the first data does not match the first type information;

a section for determining whether or not the second data matches second type information indicating a type of a second predetermined file system which is different from that of the first predetermined file system; and a section for executing a recording process or a reproduction process using the second predetermined file system when it is determined that the second data matches the second type information.

B2. A recording/reproduction method for recording/reproducing data onto/from an information recording medium, comprising:

reading first data from a first predetermined position in a data recording area of the information recording medium;

determining whether or not the first data matches first type information indicating a type of a first predetermined file system;

executing a recording process or a reproduction process using the first predetermined file system when it is determined that the first data matches the first type information;

reading second data from a second predetermined position of the data recording area when it is determined that the first data does not match the first type information;

determining whether or not the second data matches second type information indicating a type of a second predetermined file system which is different from that of the first predetermined file system; and executing a recording process or a reproduction process using the second predetermined file system when it is determined that the second data matches the second type information.

B3. A controller for use in a recording/reproduction apparatus for recording/reproducing data onto/from an information recording medium, comprising:

a section for outputting a command for reading first data from a first predetermined position in a data recording area of the information recording medium;

a section for determining whether or not the first data matches first type information indicating a type of a first predetermined file system;

a section for outputting a command for executing a recording process or a reproduction process using the first predetermined file system when it is determined that the first data matches the first type information;

a section for outputting a command for reading second data from a second predetermined position of the data recording area when it is determined that the first data does not match the first type information;

a section for determining whether or not the second data matches second type information indicating a type of a second predetermined file system which is different from that of the first predetermined file system; and a section for outputting a command for executing a recording process or a reproduction process using the second predetermined file system when it is determined that the second data matches the second type information.

Note that a recording/reproduction apparatus, a recording/reproduction method, and a controller described below fall within the scope of the present invention. These correspond to Embodiment 4.

C1. A recording/reproduction apparatus for recording/reproducing data onto/from an information recording medium, comprising:

a section for determining whether or not encrypted data recorded in a data recording area of the information recording medium is encrypted in accordance with a first predetermined copy protection method;

a section for executing a recording process or a reproduction process in accordance with the first predetermined copy protection method when it is determined that the encrypted data is encrypted in accordance with the first predetermined copy protection method;

a section for determining whether or not the encrypted data is encrypted in accordance with a second predetermined copy protection method which is different from the first predetermined copy protection method, when it is determined that the encrypted data is not encrypted in accordance with the first predetermined copy protection method; and a section for executing a recording process or a reproduction process in accordance with the second predetermined copy protection method, when it is determined that the encrypted data is encrypted in accordance with the second predetermined copy protection method.

C2. A recording/reproduction method for recording/reproducing data onto/from an information recording medium, comprising:

determining whether or not encrypted data recorded in a data recording area of the information recording medium is encrypted in accordance with a first predetermined copy protection method;

executing a recording process or a reproduction process in accordance with the first predetermined copy protection method when it is determined that the encrypted data is encrypted in accordance with the first predetermined copy protection method;

determining whether or not the encrypted data is encrypted in accordance with a second predetermined copy protection method which is different from the first predetermined copy protection method, when it is determined that the encrypted data is not encrypted in accordance with the first predetermined copy protection method; and executing a recording process or a reproduction process in accordance with the second predetermined copy protection method, when it is determined that the encrypted data is encrypted in accordance with the second predetermined copy protection method.

C3. A controller for use in a recording/reproduction method for recording/reproducing data onto/from an information recording medium, comprising:

a section for determining whether or not encrypted data recorded in a data recording area of the information recording medium is encrypted in accordance with a first predetermined copy protection method;

a section for outputting a command for executing a recording process or a reproduction process in accordance with the first predetermined copy protection method when it is determined that the encrypted data is encrypted in accordance with the first predetermined copy protection method;

a section for determining whether or not the encrypted data is encrypted in accordance with a second predetermined copy protection method which is different from the first predetermined copy protection method, when it is determined that the encrypted data is not encrypted in accordance with the first predetermined copy protection method; and a section for outputting a command for executing a recording process or a reproduction process in accordance with the second predetermined copy protection method, when it is determined that the encrypted data is encrypted in accordance with the second predetermined copy protection method.

Although certain preferred embodiments have been described herein, it is not intended that such embodiments be construed as limitations on the scope of the invention except as set forth in the appended claims. Various other modifications and equivalents will be apparent to and can be readily made by those skilled in the art, after reading the description herein, without departing from the scope and spirit of this invention. All patents, published patent applications and publications cited herein are incorporated by reference as if set forth fully herein.

INDUSTRIAL APPLICABILITY

The present invention is useful as a recording/reproduction apparatus, a recording/reproduction method, a controller and the like which are capable of maintaining data compatibility even when a single optical disc is used in different drives.

The invention claimed is:

1. A recording/reproduction apparatus for recording/reproducing data onto/from an information recording medium, comprising:
    a section for reading first data from a first predetermined position in a data recording area of the information recording medium;
    a section for determining whether or not the first data matches first type information indicating a type of a first predetermined file system;
    a section for executing a recording process or a reproduction process using the first predetermined file system when it is determined that the first data matches the first type information;
    a section for reading second data from a second predetermined position of the data recording area when it is determined that the first data does not match the first type information;
    a section for determining whether or not the second data matches second type information indicating a type of a second predetermined file system which is different from that of the first predetermined file system; and
    a section for executing a recording process or a reproduction process using the second predetermined file system when it is determined that the second data matches the second type information.

2. A recording/reproduction method for recording/reproducing data onto/from an information recording medium, comprising:
    reading first data from a first predetermined position in a data recording area of the information recording medium;
    determining whether or not the first data matches first type information indicating a type of a first predetermined file system;
    executing a recording process or a reproduction process using the first predetermined file system when it is determined that the first data matches the first type information;
    reading second data from a second predetermined position of the data recording area when it is determined that the first data does not match the first type information;
    determining whether or not the second data matches second type information indicating a type of a second predetermined file system which is different from that of the first predetermined file system; and
    executing a recording process or a reproduction process using the second predetermined file system when it is determined that the second data matches the second type information.

3. A controller for use in a recording/reproduction apparatus for recording/reproducing data onto/from an information recording medium, comprising:
    a section for outputting a command for reading first data from a first predetermined position in a data recording area of the information recording medium;
    a section for determining whether or not the first data matches first type information indicating a type of a first predetermined file system;
    a section for outputting a command for executing a recording process or a reproduction process using the first predetermined file system when it is determined that the first data matches the first type information;
    a section for outputting a command for reading second data from a second predetermined position of the data recording area when it is determined that the first data does not match the first type information;
    a section for determining whether or not the second data matches second type information indicating a type of a second predetermined file system which is different from that of the first predetermined file system; and
    a section for outputting a command for executing a recording process or a reproduction process using the second predetermined file system when it is determined that the second data matches the second type information.

* * * * *